United States Patent [19]
Gallo et al.

[11] Patent Number: 5,317,657
[45] Date of Patent: May 31, 1994

[54] EXTRUSION OF POLYMER WAVEGUIDES ONTO SURFACES

[75] Inventors: Antonio R. Gallo, Pleasant Valley; James J. McDonough, Fishkill; Gordon J. Robbins, Wappingers Falls; Robert R. Shaw, Poughkeepsie, all of N.Y.

[73] Assignee: International Business Machines Corporation, Armonk, N.Y.

[21] Appl. No.: 922,267

[22] Filed: Jul. 30, 1992

[51] Int. Cl.⁵ .................................. B29C 47/00
[52] U.S. Cl. .................. 385/14; 156/244.11; 264/1.1; 264/1.5; 264/1.7; 385/123; 385/130; 385/131; 385/132; 385/142; 385/143; 385/144; 385/145
[58] Field of Search ............ 156/244.11; 264/1.1, 264/1.5, 1.7; 385/14, 123, 130, 131, 132, 142, 143, 144, 145

[56] References Cited

U.S. PATENT DOCUMENTS

| | | | |
|---|---|---|---|
| 4,005,312 | 1/1977 | Lemelson et al. | 385/14 |
| 4,749,245 | 6/1988 | Kawatsuki et al. | 385/142 |
| 4,806,289 | 2/1989 | Laursen et al. | |
| 4,871,487 | 10/1989 | Laursen et al. | |
| 4,979,799 | 12/1990 | Herbrechtsmeier et al. | |
| 5,013,495 | 5/1991 | Noba et al. | |
| 5,054,872 | 10/1991 | Fan et al. | 385/145 |
| 5,064,577 | 11/1991 | Soane | 264/1.5 |
| 5,108,201 | 4/1992 | Matsuura et al. | 385/123 |
| 5,170,461 | 12/1992 | Yoon et al. | 385/130 |
| 5,216,727 | 6/1993 | Yakhshoori et al. | 385/142 |

OTHER PUBLICATIONS

IBM Technical Disclosure Bulletin, vol. 33, No. 3A, Aug. 1990; "Buried TI In-Diffused Waveguide on Lithium Niobate"; J. Ewen.
IBM Technical Disclosure Bulletin, vol. 33, No. 6B, Nov. 1990; "Two-Level Chip Optical Waveguide"; J. M. Leas; pp. 34–38.
IBM Technical Disclosure Bulletin, vol. 28, No. 1, Jun. 1985; "Module Interconnection by Optical Fibers"; R. E. Stadler; pp. 237–238.
IBM Technical Disclosure, vol. 33, No. 2, Jul. 1990; ". . . Silicon Nitride Waveguide Fabrication"; pp. 156–157.

*Primary Examiner*—Caleb Weston
*Attorney, Agent, or Firm*—Whitham & Marhoefer

[57] ABSTRACT

A waveguide structure is directly extruded onto a surface from a nozzle placed a predetermined distance above the surface and which is moved relative to the surface, preferably by means of a translation table. The predetermined distance is preferably maintained constant and the speed of relative motion regulated to achieve a uniform degree of molecular orientation within the extruded material, thus maintaining a sufficiently uniform refractive index along the axis of the waveguide. Partitions within the nozzle allow the formation of a layered waveguide or the simultaneous formation of concentric cladding or protective layers. The waveguides are advantageously formed as a curtain which is later patterned, by direct writing on the surface or between chips mounted on an electronic module.

24 Claims, 2 Drawing Sheets

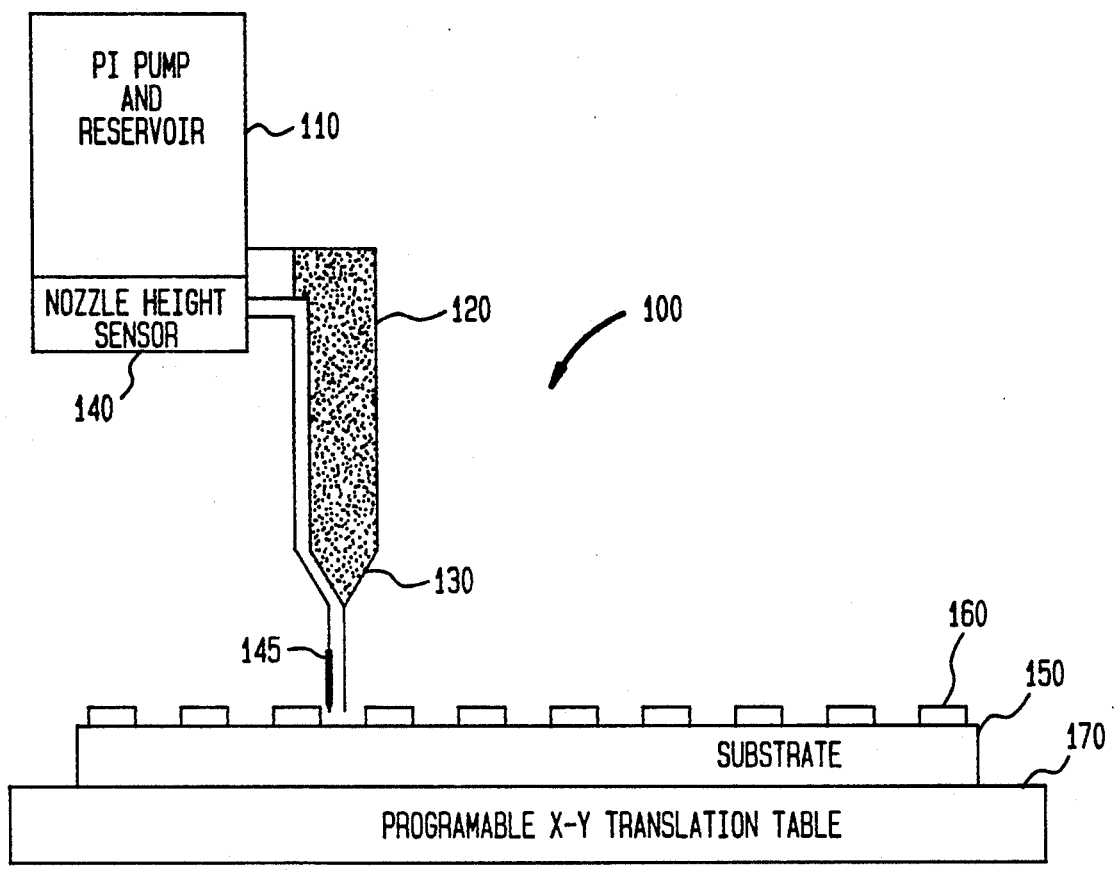
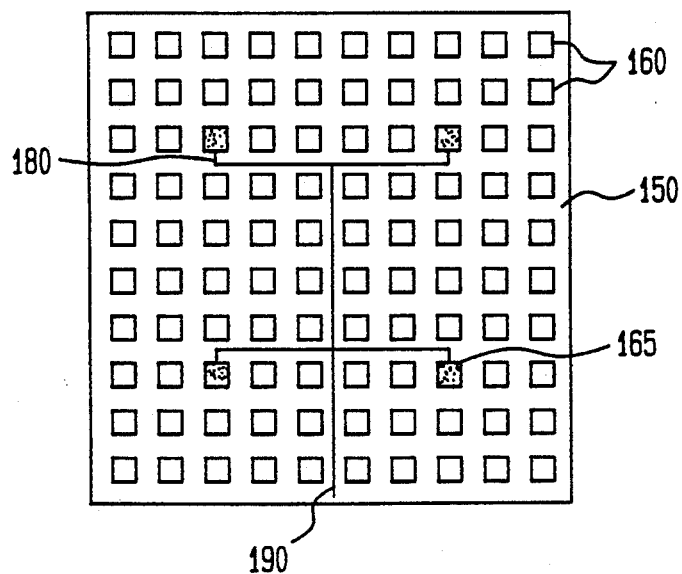
FIG. 2

EXTRUSION OF POLYMER WAVEGUIDES ONTO SURFACES

DESCRIPTION

Background of the Invention

1. Field of the Invention

The present invention generally relates to the production of optical waveguides and, more particularly, to the formation of optical waveguides as a portion of another device, such as an electronic module.

2. Description of the Prior Art

Optical communications have become increasingly popular in recent years due to their large bandwidth and freedom from most forms of electromagnetic interference. Telephone and local or wide area digital communications networks are exemplary of such applications. Optical communication links have also been used in individual devices such as alarm systems where disturbance of the optical link is detected. Further, in some high performance electronic equipment, the high bandwidth and freedom from interference make optical communication very desirable for communication or distribution of clock and other high frequency digital signals.

The structure of electronic circuit modules such as multi-layer modules of materials such as polymers or ceramics is also a suitable application for optical communication. These multilayer modules are capable of providing complex interconnection of a plurality of separate chips, each of which can be formed in accordance with mutually incompatible technologies and which may be operated over differing voltage ranges such as for bipolar and CMOS devices. The number of chips which may be accommodated is essentially arbitrary and it is not uncommon for a plurality of different clocks to be present on the same module. These clocks must usually be synchronized and may require synchronizing or master clock signals to be delivered at different voltages. If electrical signals are used, voltage conversion must often be provided which may, in turn, cause a significant delay of a synchronizing signal pulse. Therefore, optical communication of such signals is particularly desirable.

Past attempts to provide a waveguide on a surface or within a layer of an electronic module have been less than fully successful since such a layer is typically applied by a so-called spin process. As an underlying surface of the device is rapidly rotated, a waveguide material is applied to the surface at the axis of rotation. The centrifugal forces due to the spinning causes a layer to be formed with high uniformity of thickness. The spin process is well-known and the process of choice for application of many diverse materials to different surfaces and in numerous applications.

However, there are two principle drawbacks to the spin process for forming a waveguide. First, the spin process does not generally form a uniformly thick layer when the topology of the surface is other than planar. Differences in thickness or curvature of the surface of the layer may cause light loss or the pick-up of ambient light. Second, and more importantly, the spin process may radially stress the layer non-uniformly with distance from the axis of rotation. This stress, which is largely dependent on the molecular weight of the polymer, affects the alignment of molecules in the waveguide and causes the waveguide layer to be anisotropic. That is, a radial gradient of the refractive index over the distance from the spin axis may result. It has also been reported that a variation of the refractive index with angle about the spin axis will also be produced. Further, the optical waveguide generally must be patterned, and such patterning requires additional processing steps. Without patterning, the intensity of the communicated light (which may be outside the visual spectrum) diminishes significantly with distance from the source even when light losses can be kept low. On the other hand, the radial change of refractive index causes a change in refractive index at an angle to the axis of non-radial waveguides, causing increased light loss. Further, the surfaces formed by patterning are usually sufficiently irregular to scatter light and result in increased light loss. Additionally, spin coating cannot readily be accomplished after chips are in place on the module.

It is known to form optical fiber waveguides by extrusion and to form cladding layers with differing refractive indices thereon by coextrusion as taught is U.S. Pat. Nos. 4,806,289 and 4,871,487, both issued to Laursen et al. However, the extrusion processes disclosed therein include steps for drawing the fiber in tension to establish a final cross-sectional size and uniformity of stress applied to achieve desired molecular orientation to obtain a uniform index of refraction along the optical fiber. This drawing process is therefore not compatible with the formation of an optical waveguide directly on a surface or to the solution of radial molecular orientation and resulting radial gradients of index of refraction due to application of optical waveguides to surfaces by spin coating.

SUMMARY OF THE INVENTION

It is therefore an object of the present invention to provide an alternative to the formation of waveguides on surfaces by spin processes.

It is another object of the invention to provide a generally linear waveguide on a surface in a manner and of a structure which can accommodate severe surface topology without substantial light loss or signal interference.

It is a further object of the invention to provide any of a plurality of waveguide structures on a surface by a substantially common process involving only minor variations corresponding to particular waveguide structures.

It is yet another object of the invention to provide a waveguide on a surface of an electronic module which is compatible with other processes which may be required in the fabrication of such a module.

It is a yet further object of the invention to provide optical communication in an electronic circuit module in a manner consistent with the electronic and structural design thereof and requiring no displacement of electrical structure.

In order to accomplish these and other objects, the invention, in essence, provides for the direct extrusion of an optical waveguide onto a desired surface. In the course of such extrusion, the radial forces will inherently be substantially constant and the axial forces can be sufficiently regulated to avoid significant changes in refractive index along the waveguide. Further, an extruded waveguide is inherently linear and will deliver light of substantially undiminished intensity from a transmitter to a receiver over the short distances involved in an electronic circuit module. The extruded waveguide can be applied over conductors or a passivation layer applied thereover and between pins of an electronic module and thus, since such space is not otherwise usable, such optical communication effectively requires no "footprint" on the module. Further, the extrusion process is applicable to a large number of materials which can be chosen to avoid conflicts with other processes involved in the fabrication of electronic modules.

In accordance which one aspect of the invention, a method of forming a waveguide on a surface is provided including the steps of positioning an extrusion nozzle a predetermined distance above a surface, forcing a viscous material through the extrusion nozzle, relatively moving the nozzle and the surface and maintaining a predetermined level of tension in said viscous material between said nozzle and said surface.

In accordance with another aspect of the invention, a waveguide formed on a surface is provided by a process including the steps of positioning an extrusion nozzle a predetermined distance above the surface, forcing a viscous material through the extrusion nozzle, relatively moving the nozzle and the surface, and maintaining a predetermined level of tension in the viscous material between said nozzle and said surface.

BRIEF DESCRIPTION OF THE DRAWINGS

The foregoing and other objects, aspects and advantages will be better understood from the following detailed description of a preferred embodiment of the invention with reference to the drawings, in which:

FIG. 1 is a schematic view of an apparatus for the extrusion on an optical waveguide, FIG. 2 is a simplified diagram of the top surface of an exemplary electronic circuit module showing a preferred location of optical waveguides.

DETAILED DESCRIPTION OF A PREFERRED EMBODIMENT OF THE INVENTION

Figure 3:
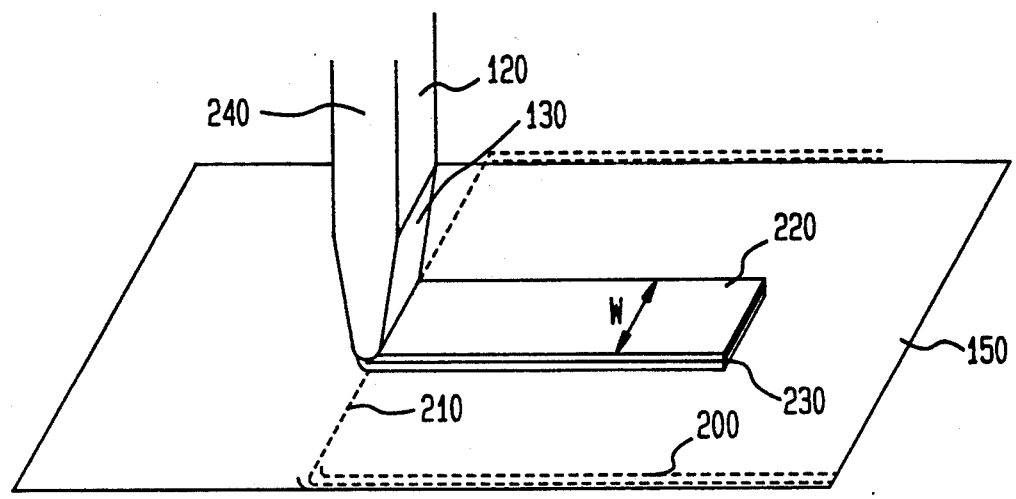
FIG. 3 is a schematic diagram of a nozzle for extruding a waveguide comprising one or more layers in accordance with one embodiment of the invention.

Referring now to the drawings, and more particularly to FIG. 1, there is schematically shown an exemplary apparatus 100 by which the invention can be practiced. The basic arrangement of this apparatus 100 is a mechanical arrangement by which relative motion can be achieved between an extrusion nozzle 130 and the surface of a substrate or layer 150. It is deemed preferable to achieve this relative motion by means of a translation table which carries the substrate or layer and is movable, for example, in orthogonal directions at high precision and controllable speed under control of a programmed computer in a manner well-understood in the art. This arrangement is preferred in order to minimize vibration and independent movement of the extrusion nozzle 130 in directions parallel to the surface which could introduce irregularities in molecular orientation of the extruded material.

The actual extrusion of the waveguide material 120 which is preferably a polymer such as polyimide is controlled by a material pump and reservoir 110 which also preferably includes structure such as heaters or mixing apparatus for maintaining the condition (e.g. viscosity, solvent content, etc.) of the waveguide material. This extrusion apparatus may also include nozzle height sensor structure 140, 145 in order to regulate tension in the extruded material as it traverses topological features, if any, of the surface upon which the waveguide is deposited. The nozzle height transducer 145 could be of a mechanical, optical or other type and is not critical to the practice of the invention as long as it can resolve whatever topological features may exist on the surface 150. The maintenance of an approximately constant predetermined separation of the nozzle and the surface is important to the practice of the invention since the unsupported length of extruded viscous material is placed in viscous tension by gravity and the relative movement of the nozzle and surface. This viscous tension largely determines the finished transverse dimension of the waveguide and also provides regulation of the degree of molecular orientation in order to achieve a uniform refractive index along the axis of the waveguide. Therefore it is important to the practice of the invention to maintain a predetermined level of viscous tension in the unsupported length of extruded material by regulating nozzle height and writing speed. As a practical matter, this is accomplished principally through the gap or separation between the extrusion nozzle 130 and the surface 150. It should be noted, however, that no molecular orientation by tension is required in order to successfully practice the invention since the orientation of refraction gradients engendered by spin coating are avoided by direct writing. Preferably, however, the degree of molecular orientation should be as constant as possible.

Chips 160 are shown as being attached to the surface 150 in FIG. 1 as is possible in some embodiments of the invention. In any event, the space between chips 160 is not otherwise used and the extrusion of waveguides at locations other than chip locations, as is more particularly shown in FIG. 2, therefore, requires no additional space of the substrate or layer surface. This feature of the present invention also allows optical waveguides to be retrofit onto existing modular circuit components and other devices. The chips 160 are generally attached on the surface 150 in a matrix pattern as shown in FIG. 2. Thus, the spaces between the chips forms an orthogonal array of potential paths for the optical waveguides 180 in order to communicate with clock chips 165 (indicated by a filled rectangle) which are typically centrally located within associated regions of the surface 150. Further, if desired, the optical waveguide can be brought out to the perimeter of the module as shown at 190 to allow communication to or from other modules either directly or through optical couplers and additional optical links, the design of which may be in accordance with that disclosed in "Module Interconnection by Optical Fibers", IBM Technical Disclosure Bulletin Vol. 28, No. 1, June 1985, pp. 237-238. However, the design of the external optical link, if used, is not critical to the practice of the invention.

Referring now to FIG. 3, one embodiment of the invention will now be discussed. In this embodiment, a nozzle having a generally linear footprint is used to extrude a pattern of waveguide of any arbitrary width up to and including the entire width of the surface 150. In this latter case, the linear footprint of the nozzle would extend along the entire length of dashed line 210 to extrude a "curtain" 200 of waveguide. In such a case, the waveguide is preferably patterned. The linear nozzle causes some stressing of the waveguide material in a direction parallel to the linear nozzle opening. However, since the patterning of the curtain waveguide would preferably follow orthogonal paths and if the nozzle is oriented along a direction of one of those orthogonal paths, the angle of any gradient in the refractive index of the waveguide to the axis of the waveguide is minimized and light loss can be kept within usable limits.

Incidentally, the formation of waveguides as a "curtain" which is thereafter patterned is the only circumstance which is necessarily incompatible with the presence of chips 160 on the surface 150. Although the desired routing of a waveguide may traverse a chip location in some designs and which would necessitate removal of the chip at such a location, if the waveguides are confined to locations between chips, it is immaterial whether the chips are present or not. It is also possible that the size or design of the extrusion nozzle might require chips to be removed (or attached after the formation of the waveguide) but the extrusion nozzles which have been used to date are generally of cylindrical exterior shape and of a diameter which only slightly exceeds the finished diameter of the waveguide and thus can successfully extrude waveguides with the chips in place.

Alternatively, the width W can be limited to any desired degree, in which case patterning can be avoided. Also, change of index of refraction across the width of the waveguide is reduced as the width of the waveguide is reduced. Provision for turning the nozzle to coincide with the orthogonal direction of relative motion between the nozzle and the surface thus results in an extruded waveguide of good uniformity and low light loss. Distribution structures to split the input light may also be readily formed in this way. In practice, it has been found that if contact can be made between different extruded segments prior to the evaporation of solvent from the segments, the segments will coalesce to form a single waveguide. Alternatively, the drying of solvent from one segment will allow one waveguide to be overlaid on or to cross another.

Regardless of the waveguide width, one or more partitions, such as 240 may be advantageously formed within the nozzle so that a plurality of layers 220, 230 with different refractive indices (e.g. for cladding above and/or below the waveguide) or protective properties (e.g. resistance to organic liquids and greases) can be simultaneously formed. By formation of such a compound nozzle so that one layer is slightly wider than an underlying layer, one or more such cladding or protective layers may be made to enclose the edges of the waveguide, as well.

Figure 4:
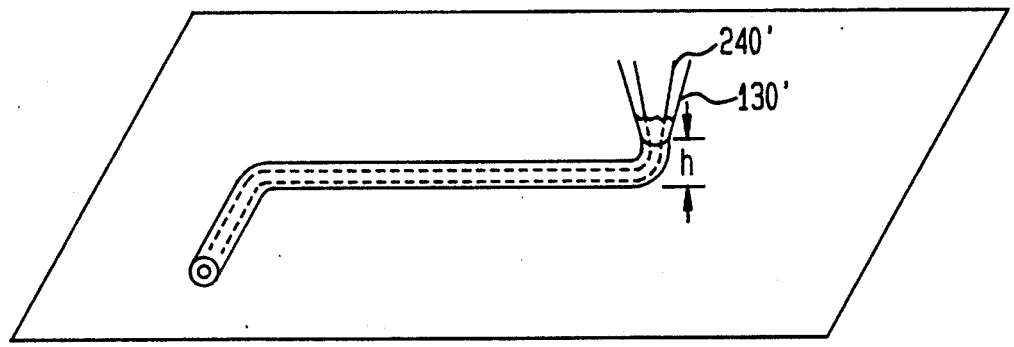
FIG. 4 is a schematic diagram of a nozzle for simultaneously extruding a waveguide and a concentric cladding therefor.

In accordance with another embodiment of the invention, as shown in FIG. 4, the extrusion nozzle 130' may be of circular (or rectangular, as a variation of the nozzle of FIG. 3) shape and partitions 240' may be provided concentrically therein, as shown in cutaway cross-section. If materials of different refractive indices are extruded through such a nozzle, a concentric cladding for the entire periphery of the section of the waveguide is formed simultaneously with the waveguide. Such a structure, having a lower refractive index material cladding surrounding a higher refractive index waveguide, is necessary if the waveguide is to operate in a total internal reflection mode and particularly if the surface on which the waveguide is to be deposited has a higher refractive index than that of the chosen waveguide material. Alternatively or additionally, a protective material can be extruded to surround the waveguide of waveguide and cladding simply by providing additional concentric partitions. Either cladding or protective material, if opaque, can protect the waveguide from susceptibility to ambient light.

It should also be noted that distribution structures such as splitters and couplers can also be formed in the same manner as the layered structure of FIG. 3. Alternatively, of course, separate waveguides could be extruded from a single transmitter such as at 190 of FIG. 2 to each of a plurality of receivers such as clock chips 165. In this regard, it should be noted that the nozzles and waveguides can be made very small and a substantial number of such waveguides can be placed in the gap between chips on a module at typical spacings thereof. Specifically, diameters of the extrusion nozzles are preferably in the range of 15–50 mils and the waveguide may be reduced further by providing an increased writing speed (e.g. movement of translation table 170) relative to the speed of the extruded material through the nozzle as well as by the spacing, h, preferably in the range of 3–5 mils, of the nozzle tip from the surface 150, as shown in FIG. 4, as is also the case with the thickness of the waveguide formed in accordance with FIG. 3. In this regard, the final transverse dimensions of the waveguide will also be affected by extrusion pressure and material viscosity.

The above techniques of extruding waveguides onto surfaces are largely independent of the material of which the surface is composed. Relatively severe topologies may be accommodated by providing for sensing of surface height. Even if the surface is relatively planar, it may be desirable to provide for such surface height sensing in the event one waveguide is made to overlie or cross another, as discussed above. The techniques according to the invention are also applicable to a wide variety of waveguide, cladding and protective materials such as polyacrylates, polycarbonates, polystyrenes, polyimides and other polymers. Virtually the only constraint on the material used is that for the "curtain" form of waveguide of a width which requires patterning and subsequent attachment of chips to the module, the cured material must be able to withstand the temperatures involved in soldering or otherwise attaching the chips.

Photosensitive polymers such as photosensitive polyimides also provide the advantage of selective curing since such materials may be caused to form cross-linkages and become cured by exposure to light. This provides the advantage of being able to cure the waveguide prior to other heat treatment steps or rapid curing treatments such as microwave curing which may be necessary in regard to the remainder of the module. Such differential curing may also be advantageously used to control wall angle and profile of the waveguide structure especially in such rapid curing processes which might otherwise cause distortion of the waveguide.

Figure 5:
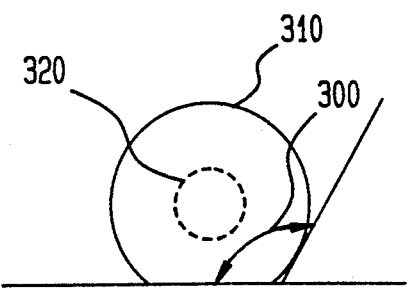
FIGS. 5 and 6 illustrate different waveguide cross-sections which can be obtained in accordance with the invention.
Figure 6:
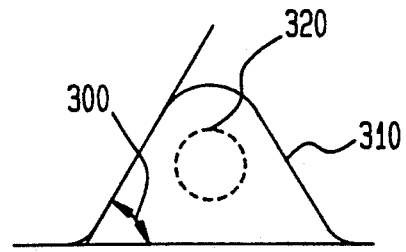

As shown in FIGS. 5 and 6, the cross-sectional shape and wall angle of the waveguide as well as the area of attachment to the surface can be controlled to a substantial degree before curing by treatment of the surface with surfactants or by other processes such as reactive ion etching or plasma treatment. Depending on the materials of the surface and the outer layer of the waveguide, the surface will be wetted to a greater or lesser degree by the extruded material. This wetting action will determine the wall angle 300 where the waveguide is attached to the surface. The use of surfactants, etching or plasma treatment generally causes an increase in this wetting action and will cause the final cross-section of the waveguide to resemble FIG. 6 more than that of FIG. 5. The edges of the waveguide produced in accordance with the embodiment of the invention illustrated in FIG. 3 can also be adjusted in the same manner. In either case, the adjustment may affect both the optical properties and the structure and adherence of the waveguide to the surface or these effects may be separated by the use of cladding 310 around the waveguide 320. It should also be noted that the waveguide cross-section may be altered independently of the wall angle at the base thereof by heat treatment (e.g. above the glass transition temperature of the waveguide material) or adjustment of the viscosity of the extruded material or both, allowing the extruded material to sag somewhat under its own weight. Thus, a substantial degree of control of both wall angle and cross-sectional shape of the waveguide is provided by the present invention.

In view of the foregoing, it is seen that the extrusion of waveguides directly onto a surface in accordance with the present invention provides a simple and inexpensive alternative to the formation of waveguides through spin processes with improved performance and which can accommodate severe surface topology. Any of a number of waveguide shapes, profiles and cross-sections and claddings and protective coverings can be formed by variations of the invention involving only choice of materials and substitution of nozzle structures. No changes in design, materials or structure of electronic modules is required by the practice of the invention and waveguides may even be retrofit onto existing modules in accordance with the present invention.

While the invention has been described in terms of a single preferred embodiment, those skilled in the art will recognize that the invention can be practiced with modification within the spirit and scope of the appended claims.

Having thus described my invention, what I claim as new and desire to secure by Letters Patent is as follows:

1. A method of forming a waveguide on a surface, said method including the steps of
    positioning an extrusion nozzle a predetermined distance above said surface,
    forcing a viscous waveguide material through said extrusion nozzle,
    relatively moving said nozzle and said surface, and
    maintaining a predetermined level of tension in said viscous waveguide material between said nozzle and said surface.

2. A method as recited in claim 1, wherein said nozzle includes at least one partition and said forcing step includes simultaneously forcing viscous materials separated by said at least one partition through said extrusion nozzle.

3. A method as recited in claim 1, including the further step of patterning said extruded material.

4. A method as recited in claim 1, including the further step of
    performing a treatment operation on said surface.

5. A method as recited in claim 4, wherein said treatment operation includes
    applying a surfactant to said surface.

6. A method as recited in claim 4, wherein said treatment operation includes
    exposing said surface to a plasma.

7. A method as recited in claim 2, including the further step of
    performing a treatment operation on said surface.

8. A method as recited in claim 7, wherein said treatment operation includes
    applying a surfactant to said surface.

9. A method as recited in claim 7, wherein said treatment operation includes
    exposing said surface to a plasma.

10. A method as recited in claim 1, wherein said surface is the surface of an electronic module.

11. A method as recited in claim 9, wherein said electronic module has chips mounted thereon and said viscous material is deposited between said chips.

12. A waveguide having all gradients of refractive index therein oriented approximately along an optical axis of said waveguide formed on a surface by a process including the steps of
    positioning an extrusion nozzle a predetermined distance above said surface,
    forcing a viscous waveguide material through said extrusion nozzle,
    relatively moving said nozzle and said surface
    maintaining a predetermined level of tension in said viscous waveguide material between said nozzle and said surface.

13. A waveguide as recited in claim 12, wherein said nozzle includes at least one partition and said forcing step includes simultaneously forcing viscous materials separated by said at least one partition through said extrusion nozzle.

14. A waveguide as recited in claim 12, including the further step of patterning said extruded material.

15. A waveguide as recited in claim 12, including the further step of
    performing a treatment operation on said surface.

16. A waveguide as recited in claim 15, wherein said treatment operation includes
    applying a surfactant to said surface.

17. A waveguide as recited in claim 15, wherein said treatment operation includes
    exposing said surface to a plasma.

18. A waveguide as recited in claim 13, including the further step of
    performing a treatment operation on said surface.

19. A waveguide as recited in claim 18, wherein said treatment operation includes
    applying a surfactant to said surface.

20. A waveguide as recited in claim 18, wherein said treatment operation includes
    exposing said surface to a plasma.

21. A waveguide as recited in claim 13, wherein said waveguide includes a plurality of layers formed by said forcing step.

22. A waveguide as recited in claim 13, wherein said waveguide includes at least one layer concentrically formed around the waveguide.

23. A waveguide as recited in claim 12, wherein said surface is the surface of an electronic module.

24. A waveguide as recited in claim 23, wherein said electronic module has chips mounted thereon and said viscous material is deposited between said chips.

* * * * *

UNITED STATES PATENT AND TRADEMARK OFFICE
CERTIFICATE OF CORRECTION

PATENT NO. : 5,317,657
DATED : May 31, 1994
INVENTOR(S) : Antonio R. Gallo, et al.

It is certified that error appears in the above-indentified patent and that said Letters Patent is hereby corrected as shown below:

Drawing sheet 1 of 2, please add "FIG. 1" to identify the first drawing.

Signed and Sealed this

Twenty-eighth Day of October, 1997

Attest:

BRUCE LEHMAN

Attesting Officer     Commissioner of Patents and Trademarks